(12) United States Patent
Gaurav et al.

(10) Patent No.: US 10,546,269 B1
(45) Date of Patent: Jan. 28, 2020

(54) METHOD AND APPARATUS FOR MANAGING ITEM INVENTORIES

(71) Applicant: Groupon, Inc., Chicago, IL (US)

(72) Inventors: Prashant Gaurav, Mountain View, CA (US); Nipun Agarwal, Fremont, CA (US); Sushant Wason, Chicago, IL (US)

(73) Assignee: GROUPON, INC., Chicago, IL (US)

( * ) Notice: Subject to any disclaimer, the term of this patent is extended or adjusted under 35 U.S.C. 154(b) by 709 days.

(21) Appl. No.: 14/881,723

(22) Filed: Oct. 13, 2015

Related U.S. Application Data

(63) Continuation of application No. 14/843,048, filed on Sep. 2, 2015.

(51) Int. Cl.
*G06Q 10/00* (2012.01)
*G06Q 10/08* (2012.01)

(52) U.S. Cl.
CPC ....... *G06Q 10/087* (2013.01); *G06Q 10/0875* (2013.01)

(58) Field of Classification Search
CPC .......................... G06Q 10/087; G06Q 10/0875
USPC ...................................................... 705/26, 28
See application file for complete search history.

(56) References Cited

U.S. PATENT DOCUMENTS

| | | | |
|---|---|---|---|
| 7,295,990 B1 * | 11/2007 | Braumoeller | G06Q 10/063 705/7.31 |
| 7,921,071 B2 | 4/2011 | Hicks | |
| 8,209,242 B1 * | 6/2012 | Henderson | G06Q 10/087 700/100 |
| 2003/0163399 A1 | 8/2003 | Harper et al. | |
| 2005/0189414 A1 * | 9/2005 | Fano | G06Q 30/02 235/383 |
| 2010/0161619 A1 | 6/2010 | Lamere et al. | |
| 2012/0330778 A1 | 12/2012 | Eastham | |
| 2013/0211927 A1 | 8/2013 | Kellogg et al. | |

(Continued)

OTHER PUBLICATIONS

U.S. Appl. No. 14/219,349, filed Mar. 19, 2014; In re: Ayars et al., entitled *Method and Apparatus for Generating an Electronic Communication*.

(Continued)

*Primary Examiner* — Rokib Masud
(74) *Attorney, Agent, or Firm* — Alston & Bird LLP

(57) ABSTRACT

The present disclosure relates to methods, systems, and apparatuses for identifying related records in a database. The method determining an item identifier for at least one item stored in an item catalog database, accessing the item catalog database to determine one or more item attributes for the at least one item, accessing an item inventory database to determine one or more item inventory levels for the at least one item, using, by a processor, a predictive model to calculated a predicted inventory level for the at least one item, the predictive model indicating an estimated inventory level for the at least one item at a particular time subsequent to the calculation of the predicted inventory level, wherein the predictive model receives the one or more item attributes and the one or more item inventory levels as inputs, storing the predicted inventory level, and using the predicted inventory level to evaluate an electronic marketing communication for transmission, wherein the electronic marketing communication comprises content related to the at least one item.

20 Claims, 6 Drawing Sheets

(56) References Cited

U.S. PATENT DOCUMENTS

2014/0122502 A1   5/2014   Kalmes et al.
2014/0156466 A1*  6/2014   Westphal ........... G06Q 30/0635
                                              705/26.81
2014/0379520 A1   12/2014  Nemery et al.

OTHER PUBLICATIONS

U.S. Appl. No. 14/843,048, filed Sep. 2, 2015; In re: Gaurav et al., entitled *Method and Apparatus for Managing Item Inventories*.
U.S. Appl. No. 62/098,987, filed Dec. 31, 2014; In re: Violette et al., entitled *Methods and Systems for Managing Transmissin of Electornic Marketing Communications*.

* cited by examiner

METHOD AND APPARATUS FOR MANAGING ITEM INVENTORIES

CROSS REFERENCE TO RELATED APPLICATIONS

This application is a continuation of U.S. application Ser. No. 14/843,048 filed Sep. 2, 2015, the entire contents of which are incorporated herein by reference

TECHNOLOGICAL FIELD

Example embodiments of the present invention relate generally to product inventory systems and, more particularly, to methods, systems, and apparatuses for managing product inventory levels and facilitating interactions among databases and other components of a product marketing and ordering system.

BACKGROUND

The applicant has discovered problems with current methods, systems, and apparatuses for managing product inventories. Through applied effort, ingenuity, and innovation, Applicant has solved many of these identified problems by developing a solution that is embodied by the present invention, which is described in detail below.

BRIEF SUMMARY

Accordingly, a method, apparatus, and computer program product to manage item inventories. Example embodiments may include methods, apparatuses, and computer program products. An example of a method for managing item inventories includes determining an item identifier for at least one item stored in an item catalog database, accessing the item catalog database to determine one or more item attributes for the at least one item, accessing an item inventory database to determine one or more item inventory levels for the at least one item, using, by a processor, a predictive model to calculate a predicted inventory level for the at least one item, the predictive model indicating an estimated inventory level for the at least one item at a particular time subsequent to the calculation of the predicted inventory level, wherein the predictive model receives the one or more item attributes and the one or more item inventory levels as inputs, storing the predicted inventory level, and using the predicted inventory level to evaluate an electronic marketing communication for transmission, wherein the electronic marketing communication comprises content related to the at least one item.

Evaluating the electronic marketing communication for transmission may include transmitting the electronic marketing communication in response to the predicted inventory level indicating that the item will not sell out for at least a threshold period of time. The item identifier may be determined based on the item identifier being received from an electronic marketing communication transmission service, and wherein using the predicted inventory level to evaluate the electronic marketing communication comprises notifying the electronic marketing communication transmission service of the predicted inventory level. The predictive model may be generated by performing a regression analysis of stored historical data for the one or more item attributes and stored historical data for the or more item inventory levels. The method may also include determining an actual inventory level at the particular time for the at least one item, determining an error between the actual inventory level and the predicted inventory level, and updating the predictive model based on the error. Updating the predictive model may include adjusting a weight of at least one of the item attributes. At least one of the one or more item attributes may be used to perform a lookup on the item inventory database. Evaluating the electronic marketing communication for transmission may include selecting the at least one item for inclusion in the electronic marketing communication based on the predicted inventory level for the at least one item being greater than a threshold inventory level.

Embodiments also include an apparatus for generating electronic marketing communications. The apparatus includes catalog circuitry configured to determine an item identifier for at least one item stored in an item catalog database, and access the item catalog database to determine one or more item attributes for the at least one item. The apparatus also includes inventory circuitry configured to access an item inventory database to determine one or more item inventory levels for the at least one item. The apparatus further includes prediction circuitry configured to use a predictive model to calculate a predicted inventory level for the at least one item. The predictive model indicates an estimated inventory level for the at least one item at a particular time subsequent to the calculation of the predicted inventory level. The predictive model receives the one or more item attributes and the one or more item inventory levels as inputs. The prediction circuitry is also configured to store the predicted inventory level. The apparatus also includes item transmission circuitry configured to use the predicted inventory level to evaluate an electronic marketing communication for transmission. The electronic marketing communication includes content related to the at least one item.

Evaluating the electronic marketing communication for transmission may include transmitting the electronic marketing communication in response to the predicted inventory level indicating that the item will not sell out for at least a threshold period of time. The item identifier may be determined based on the item identifier being received from an electronic marketing communication transmission service, and wherein using the predicted inventory level to evaluate the electronic marketing communication comprises notifying the electronic marketing communication transmission service of the predicted inventory level. The predictive model may be generated by performing a regression analysis of stored historical data for the one or more item attributes and stored historical data for the or more item inventory levels. The prediction circuitry may be further configured to determine an actual inventory level for at the particular time for the at least one item, determine an error between the actual inventory level and the predicted inventory level, and update the predictive model based on the error. Updating the predictive model may include adjusting a weight of at least one of the item attributes.

At least one of the one or more item attributes may be used to perform a lookup on the item inventory database. Evaluating the electronic marketing communication for transmission may include selecting the at least one item for inclusion in the electronic marketing communication based on the predicted inventory level for the at least one item being greater than a threshold inventory level.

Embodiments also include an apparatus for generating electronic marketing communications comprising means for determining an item identifier for at least one item stored in an item catalog database, means for accessing the item catalog database to determine one or more item attributes for the at least one item, means for accessing an item inventory database to determine one or more item inventory levels for the at least one item, and means for using a predictive model to calculate a predicted inventory level for the at least one item. The predictive model indicates an estimated inventory level for the at least one item at a particular time subsequent to the calculation of the predicted inventory level and the predictive model receives the one or more item attributes and the one or more item inventory levels as inputs. The apparatus also includes means for storing the predicted inventory level and means for use the predicted inventory level to evaluate an electronic marketing communication for transmission. The electronic marketing communication comprises content related to the at least one item.

Evaluating the electronic marketing communication for transmission may include transmitting the electronic marketing communication in response to the predicted inventory level indicating that the item will not sell out for at least a threshold period of time. The item identifier may be determined based on the item identifier being received from an electronic marketing communication transmission service, and wherein using the predicted inventory level to evaluate the electronic marketing communication comprises notifying the electronic marketing communication transmission service of the predicted inventory level. The predictive model may be generated by performing a regression analysis of stored historical data for the one or more item attributes and stored historical data for the or more item inventory levels.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
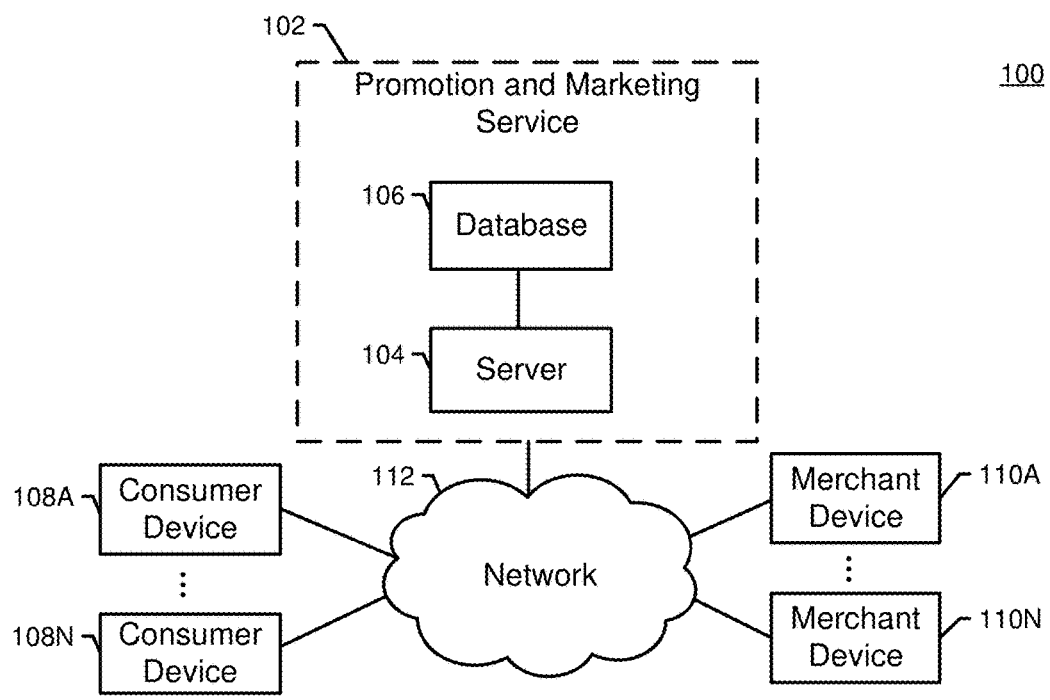
Figure 2:
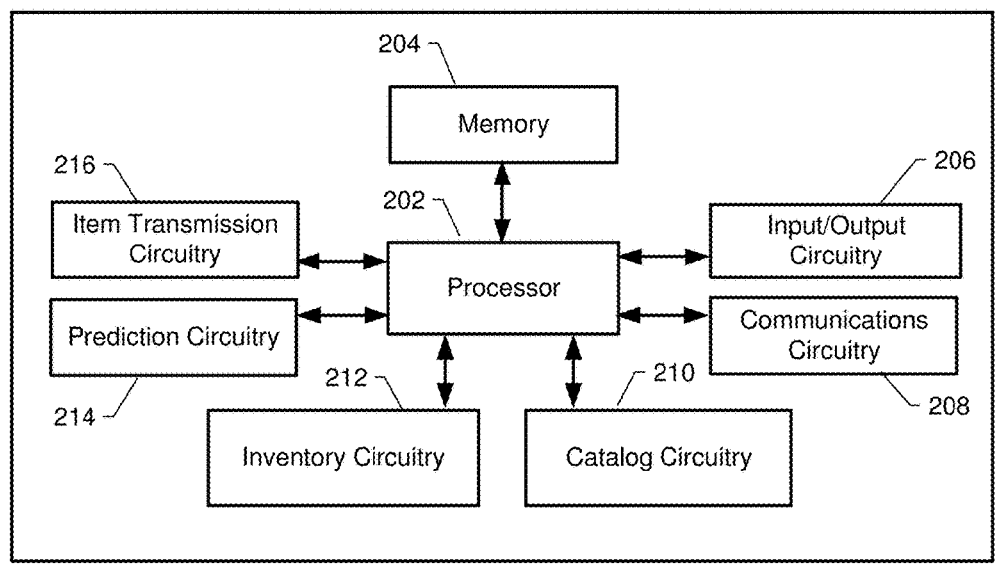
Figure 3:
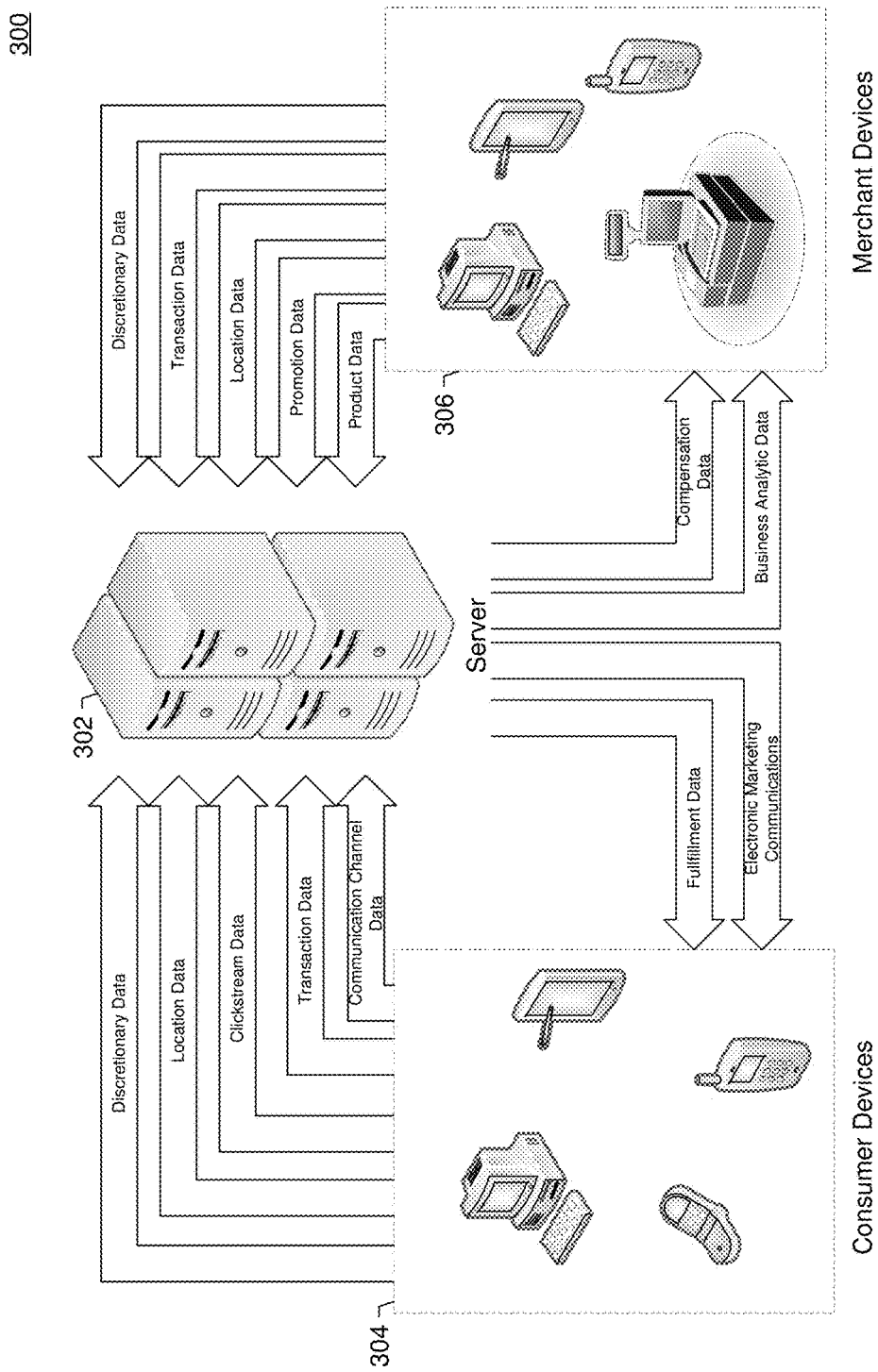
Figure 4:
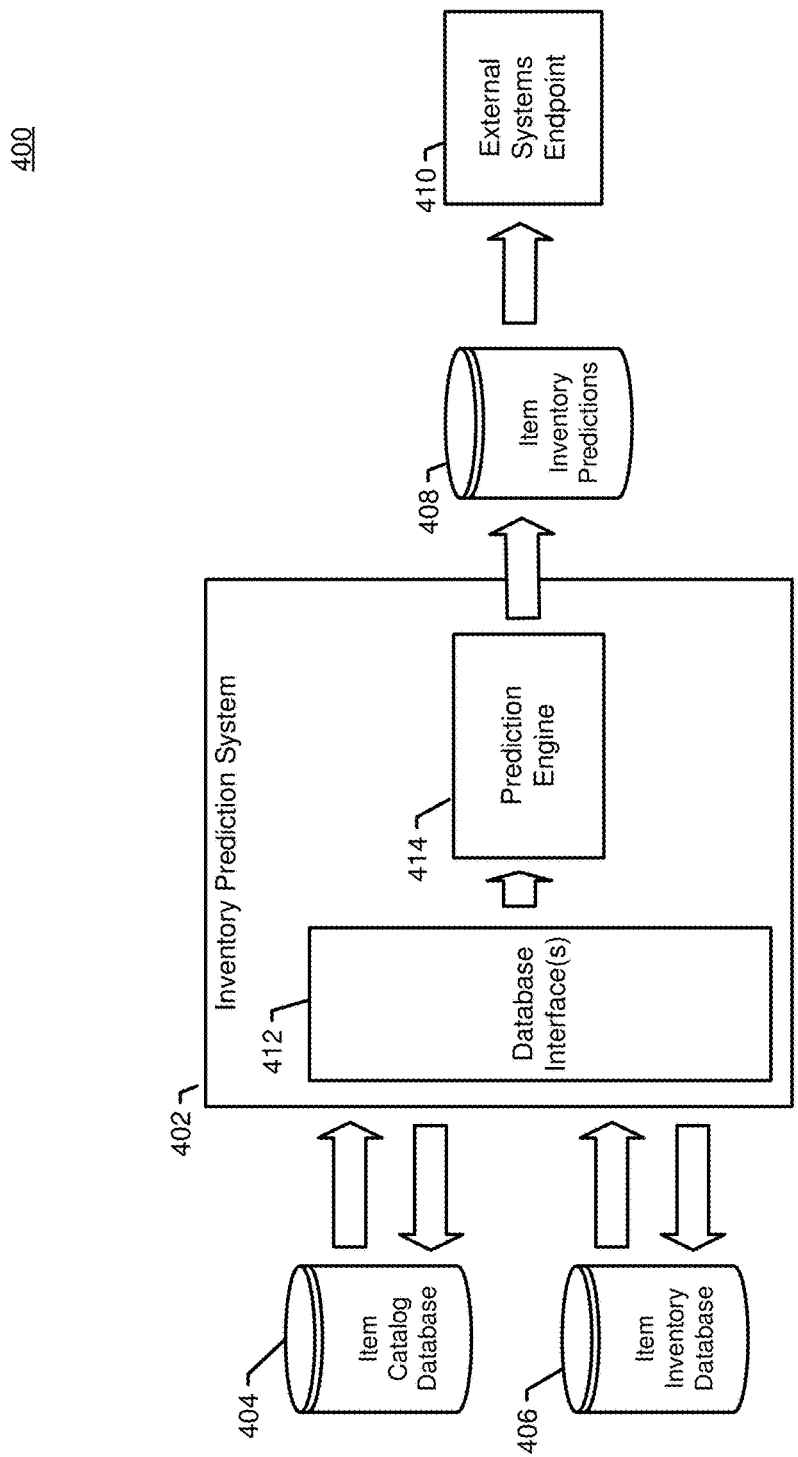
Figure 5:
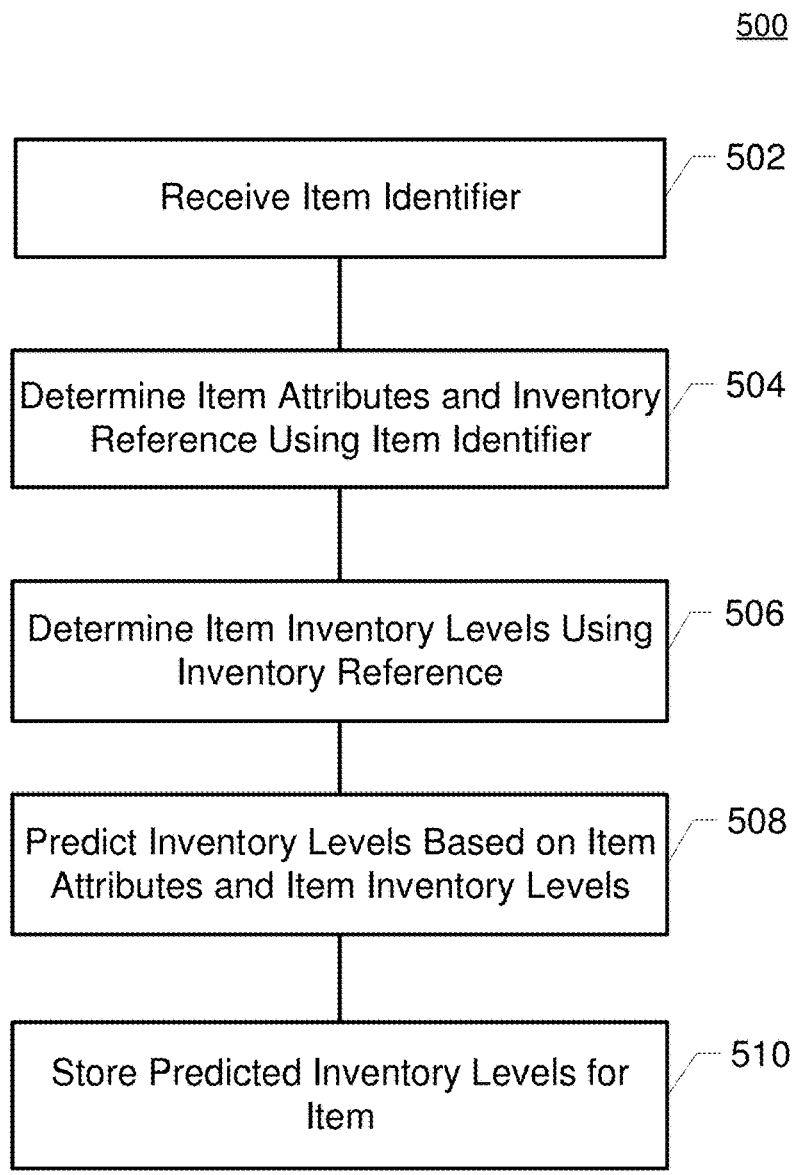
Figure 6:
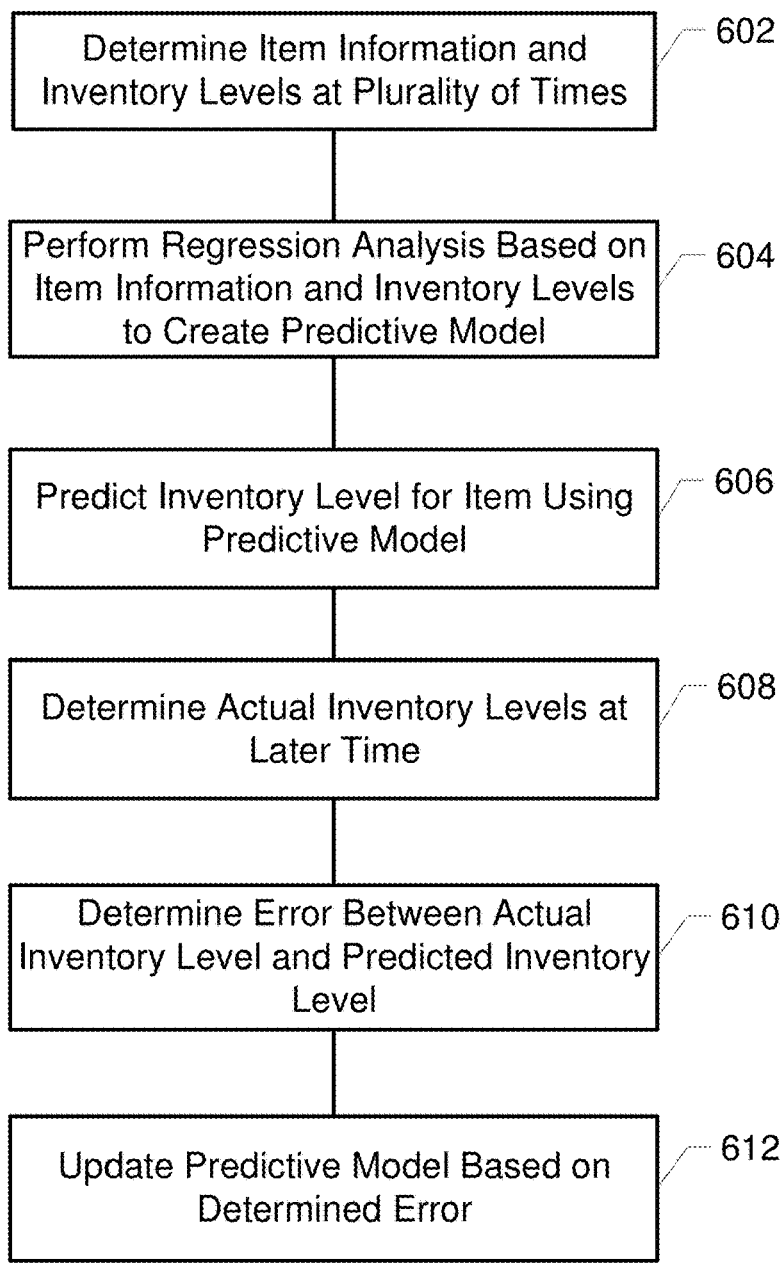

Having thus described certain example embodiments of the present disclosure in general terms, reference will now be made to the accompanying drawings, which are not necessarily drawn to scale, and wherein:

FIG. 1 illustrates an example system within which some embodiments of the present invention may operate;

FIG. 2 illustrates a block diagram of an example device for implementing a promotion recommendation engine using special-purpose circuitry in accordance with some embodiments of the present invention;

FIG. 3 illustrates an example data flow among a consumer device, a server, and a merchant device in accordance with some embodiments of the present invention;

FIG. 4 illustrates an example data flow interaction between elements of an example device for managing an item inventory in accordance with some embodiments of the present invention;

FIG. 5 illustrates a flowchart describing example operations for managing an item inventory in accordance with some embodiments of the present invention; and FIG. 6 illustrates a flowchart describing example operations for updating a predictive model used for managing an item inventory in accordance with some embodiments of the present invention.

DETAILED DESCRIPTION

Overview

Various embodiments of the present invention are directed to improved apparatuses, methods, and computer readable media for managing inventories of items. In this regard, embodiments of the present invention provide systems, devices, and frameworks that employ predictive modeling to facilitate interaction among multiple databases for the purpose of predicting item inventories over time. These inventory predictions may be employed to determine which items to actively market, list for sale, or reorder. Inventory predictions may be made using a predictive model that takes into account a variety of attributes for each item. The use of a predictive model in this manner may allow for estimation of item inventory levels even for items which do not yet have statistically significant data (e.g., in the case where an item is being offered for sale for the first time). Embodiments may also provide a mechanism to update the predictive model over time, thereby providing improved performance as more data is gathered.

Inventory management presents many difficult problems for merchants and marketers. In particular, merchants and marketers must attempt to balance marketing of desirable products (i.e., products that are likely to be of interest to consumers) with marketing of products with sufficient inventory levels (i.e., products that have a sufficient quantity remaining to justify the expense/opportunity cost of the marketing effort). This problem is particularly evident in the field of Internet marketing, where desirable items with attractive discounts may sell out in minutes. Marketing efforts that advertise items that sell out quickly run the risk of disappointing consumers that are unable to obtain the desirable item.

Furthermore, electronic marketing efforts often place a particular emphasis on providing accurate data in real-time. Some marketing systems may market to consumers based on information that is likely to change in a short amount of time, such as the location of the consumer, the time of day, the activity in which the consumer is engaged, whether the consumer is actively engaged with a particular application, or the like. Since such electronic marketing communications are often highly time sensitive and specifically targeted, it is extremely desirable to ensure that items marketed through such communications have sufficient available inventory to give the consumer a reasonable opportunity to purchase the marketed item.

The inventors have recognized that existing inventory management systems are inadequate to address these problems and other problems related to real-time generation of electronic marketing communications. The inventors have thus developed methods, systems, and frameworks that provide real-time inventory management to support real-time generation of electronic marketing communication by providing accurate reports and predictions of item inventory levels. These methods, systems, and frameworks may include implementation of additional application and communication layers between different databases to support the generation of real-time inventory data.

Embodiments of the present invention may be employed, for example, in web applications to obtain information about product inventory levels to ensure that sufficient inventory exists to justify generation of electronic marketing communications to market particular items. Embodiments may also use item inventory levels to select items that are not likely to sell out without additional marketing efforts. For example, even if a particular item has a large inventory remaining, additional marketing of that item may not be justified if the item is on pace to sell out without such marketing efforts.

It should be readily appreciated that the embodiments of the methods, systems, devices, and apparatuses for managing an inventory of items may be configured in various additional and alternative manners to provide real-time management of item inventory within the context of a promotion and marketing service as described herein.

Definitions

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and that is operable to provide promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. The "provider" or "merchant" need not actually market a product via the promotion and marketing service, as some merchants or providers may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), location data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, or radio frequency identification (RFID) location systems.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, is should be appreciated that the examples of discretionary data provided above may also be determined implicitly or through review or analysis of other electronic marketing information provided to the promotion and marketing service. It should also be appreciated that the promotion and marketing service may also gate access to certain features or tools based on whether certain discretionary data has been provided. For example, the consumer may be required to provide information relating to their interests or location during a registration process.

As used herein, the term "offering parameters" refers to terms and conditions under which the promotion is offered by a promotion and marketing service to consumers. These offering parameters may include parameters, bounds, considerations and/or the like that outline or otherwise define the terms, timing, constraints, limitations, rules or the like under which the promotion is sold, offered, marketed, or otherwise provided to consumers. Example offering parameters include, using the aforementioned restaurant as the example provider, limit one instrument per person, total of 100 instruments to be issued, a run duration of when the promotion will be marketed via the promotion and marketing service, and parameters for identifying consumers to be offered the promotion (e.g., factors influencing how consumer locations are used to offer a promotion).

As used herein, the term "redemption parameters" refers to terms and conditions for redeeming or otherwise obtaining the benefit of promotions obtained from a promotion and marketing service. The redemption parameters may include parameters, bounds, considerations and/or the like that outline the term, timing, constraints, limitations, rules or the like for how and/or when an instrument may be redeemed. For example, the redemption parameters may include an indication that the instrument must be redeemed prior to a specified deadline, for a specific good, service or experience and/or the like. For example, using the aforementioned restaurant as the example provider, the redemption parameters may specify a limit of one instrument per visit, that the promotion must be used in store only, or that the promotion must be used by a certain date.

As used herein, the term "promotion content" refers to display factors or features that influence how the promotion is displayed to consumers. For example, promotion content may include an image associated with the promotion, a narrative description of the promotion or the merchant, a display template for association with the promotion, or the like. Various other factors may be used to generate the promotion offer, such as the success of the promotion offers generated by the merchants with similar characteristics, the product availability of the merchant, and the like.

As used herein, the term "promotion component" is used to refer to elements of a particular promotion that may be selected during a promotion generation process. Promotion components may include any aspect of a promotion, including but not necessarily limited to offering parameters, redemption parameters, and promotion content. For example, promotion components may include, but are not limited to, promotion titles, promotion ledes (e.g., a short text phrase displayed under a promotion title), promotion images, promotion prices, promotion discount levels, promotion style sheets, promotion fonts, promotion e-mail subjects, promotion quantities, promotion fine print options, promotion fees assessed to the merchant by the promotion and marketing service, or the like. Promotion components may also include various flags and settings associated with registration and verification functions for a merchant offering the promotion, such as whether the identity of the merchant has been verified, whether the merchant is registered with the promotion and marketing service, or the like.

As used herein, the term "electronic marketing communication" refers to any electronically generated information content provided by the promotion and marketing service to a consumer for the purpose of marketing a promotion, good, or service to the consumer. Electronic marketing communications may include any email, short message service (SMS) message, web page, application interface, or the like electronically generated for the purpose of attempting to sell or raise awareness of a product, service, promotion, or merchant to the consumer.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including marketing materials programmatically selected based on electronic marketing information associated with the recipient would qualify as an electronic marketing communication.

As used herein, the term "business analytic data" refers to data generated by the promotion and marketing service based on electronic marketing information to assist with the operation of the promotion and marketing service and/or one or more merchants. The various streams of electronic marketing information provided to and by the promotion and marketing service allow for the use of sophisticated data analysis techniques that may be employed to identify correlations, relationships, and other associations among elements of electronic marketing information. These associations may be processed and formatted by the promotion and marketing service to provide reports, recommendations, and services both internal to the promotion and marketing service and to merchants in order to improve the process by which merchants and promotion and marketing service engage with consumers. For example, the promotion and marketing service may analyze the electronic marketing information to identify an increased demand for a particular product or service, and provide an electronic report to a merchant suggesting the merchant offer the particular product or service. Alternatively, the promotion and marketing service may identify that a particular product or service is not selling or resulting in the merchant losing money, customers, or market share (e.g., after consumers order a particular menu item, they never come back to the merchant), and suggest that the merchant should discontinue offering that product or service.

It should be appreciated that the term "business analytic data" is intended to refer to electronically and programmatically generated data. For example, a printed report or letter manually drafted by an employee of the promotion and marketing service would not be said to include business analytic data, even if said data was used by the employee during the drafting process, while a data disk or downloaded file containing analytics generated by the promotion and marketing service would be considered business analytic data.

As used herein, the term "item" refers to products, goods, services, and/or promotions as sold by a promotion and marketing service or other e-commerce system. Items may be tangible (e.g. goods, physical gift cards, physical certificates) or intangible (e.g., electronic codes, account credits).

As used herein, the term "record" refers to a particular entry in a database. A record includes multiple attributes which provide data regarding a particular entity. In the present context, the described entity may be an item offered by a promotion and marketing service.

Technical Underpinnings and Implementation of Exemplary Embodiments

Merchants, including manufacturers, wholesalers, and retailers, have spent a tremendous amount of time, money, manpower, and other resources to determine the best way to market their products to consumers. Whether a given marketing effort is successful is often determined based on the return-on-investment offered to the merchant from increased awareness, sales, and the like of the merchant's goods and services in exchange for the resources spent on the marketing effort. In other words, optimal marketing techniques generally maximize the benefit to the merchant's bottom line while minimizing the cost spent on marketing. To this end, a merchant's marketing budget may be spent in a variety of different manners including advertising, offering of discounts, conducting market research, and various other known marketing techniques. The end goal of these activities is to ensure that products are presented to consumers in a manner that maximizes the likelihood that the consumers will purchase the product from the merchant that performed the marketing activities while minimizing the expense of the marketing effort.

The advent of electronic commerce has revolutionized the marketing process. While merchants would typically have to perform costly market research such as focus groups, surveys, and the like to obtain detailed information on consumer preferences and demographics, the digital age has provided a wealth of new consumer information that may be used to optimize the marketing and sales process. As a result, new technologies have been developed to gather, aggregate, analyze, and report information from a variety of electronic sources.

So-called "clickstream data" provides a robust set of information describing the various interactions consumers have with electronic marketing communications provided to them by merchants and others. Promotion and marketing services have been developed with sophisticated technology to receive and process this data for the benefit of both merchants and consumers. These services assist merchants with marketing their products to interested consumers, while reducing the chance that a consumer will be presented with marketing information in which the consumer has no interest. Some promotion and marketing services further leverage their access to a trove of electronic marketing information to assist merchants and consumers with other tasks, such as offering improved merchant point-of-sale systems, improved inventory and supply chain management, improved methods for delivering products, and the like.

Unlike conventional marketing techniques related to the use of paper or other physical media (e.g., coupons clipped from a weekly newspaper), promotion and marketing services offer a wealth of additional electronic solutions to improve the experience for consumers and merchants. The ability to closely monitor user impressions provides the ability for the promotion and marketing service to gather data related to the time, place, and manner in which the consumer engaged with the impression (e.g., viewed, clicked, moused-over) and obtained and redeemed the promotion. The promotion and marketing service may use this information to determine which products are most relevant to the consumer's interest and to provide marketing materials related to said products to the consumer, thus improving the quality of the electronic marketing communications received by the consumer. Merchants may be provided with the ability to dynamically monitor and adjust the parameters of promotions offered by the promotion and marketing service, ensuring that the merchant receives a positive return on their investment. For example, the merchant can closely monitor the type, discount level, and quantity sold of a particular promotion on the fly, while with traditional printed coupons the merchant would not be able to make any changes to the promotion after the coupon has gone to print. Each of these advancements in digital market and promotion distribution involve problems unique to the digital environment not before seen in traditional print or television broadcast marketing.

However, these promotion and marketing services are not without problems. Although electronic marketing information provides a wealth of information, the inventors have determined that existing techniques may not always leverage this information in an efficient or accurate manner. Technology continues to rapidly advance in the field of analytics and the processing of this information, offering improved data gathering and analysis techniques, resulting in more relevant and accurate results provided in a more efficient manner. Electronic marketing services continue to evolve and provide improved methods for engaging consumers and spreading awareness of products offered by promotion and marketing services.

In many cases, the inventors have determined that these services are constrained by technological obstacles unique to the electronic nature of the services provided, such as constraints on data storage, machine communication and processor resources. The inventors have identified that the wealth of electronic marketing information available to these services and the robust nature of electronic marketing communications techniques present new challenges never contemplated in the world of paper coupons and physical marketing techniques. The inventors have further determined that even technological methods that leverage computers for statistical analysis and consumer behavior modeling (e.g., television rating systems) fail to address problems associated with providing relevant, high quality electronic marketing communications (e.g., impressions) to consumers in a manner that maximizes accuracy, minimizes error, is user friendly and provides for efficient allocation of resources. Embodiments of the present invention as described herein serve to correct these errors and offer improved resource utilization, thus providing improvements to electronic marketing services that address problems arising out of the electronic nature of those services.

One particular problem inherent in promotion and marketing systems relates to the management of item inventories. As noted above, promotion and marketing systems may generate electronic marketing communications in a real-time, on-demand manner such that consumers are provided with electronic marketing communications that have unique relevance to the consumer at a particular time or set of circumstances. Providing these electronic marketing communications in this manner requires rapid decision making by the promotion and marketing system to select products, services, or other items for inclusion in the electronic marketing communication. To support these real-time processes, the inventors have developed real-time inventory management systems that are capable of tracking item inventory levels in real-time so as to ensure that items included in outgoing electronic marketing communications are available for purchase at the moment the electronic marketing communication is selected, generated, and/or transmitted. Embodiments further employ predictive models to determine whether and when particular items are likely to remain in stock. Such models may make predictions based on a variety of factors related to them in-stock items, including but not limited to the current inventory, the rate of sale, the type of item, the cost of the item to the promotion and marketing service, the sale price of the item, whether the item is typically sold as a single item or in a larger quantity, the time of day, the day of the week, an expiration of the item (e.g., a particular date or time at which the item is no longer to be sold), a duration of the item (e.g., the length of time a sold promotion is valid once sold), or the like. In some embodiments, the predictive model may be dynamically updated to improve its predictive capabilities, such as through the use of a neural network or other machine learning technique. As a result, embodiments provide for improved inventory management systems that are particularly applicable to use within electronic commerce systems such as promotion and marketing systems.

System Architecture

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. Merchants may access a promotion and marketing service 102 via a network 112 (e.g., the Internet, or the like) using computer devices 108A through 108N and 110A through 110N, respectively (e.g., one or more consumer devices 108A-108N or one or more merchant devices 110A-110N). The promotion and marketing service 102 may function to manage item inventories as described herein and below. Moreover, the promotion and marketing service 102 may comprise a server 104 in communication with one or more databases, such as a database 106.

The server 104 may be embodied as a computer or computers as known in the art. The server 104 may provide for receiving of electronic data from various sources, including but not necessarily limited to the consumer devices 108A-108N and the merchant devices 110A-110N. For example, the server 104 may be operable to receive and process clickstream data provided by the consumer devices 108 and/or the merchant devices 110. The server 104 may also facilitate e-commerce transactions based on transaction data provided by the consumer devices 108 and/or the merchant devices 110. The server 104 may facilitate the generation and providing of various electronic marketing communications and marketing materials based on the received electronic marketing information.

The database 106 may be embodied as a data storage device such as a Network Attached Storage (NAS) device or devices, or as a separate database server or servers. The database 106 includes information accessed and stored by the server 104 to facilitate the operations of the promotion and marketing service 102. For example, the database 106 may include, without limitation, user account credentials for system administrators, merchants, and consumers, data indicating the products offered by the promotion and marketing service, electronic marketing information, analytics, reports, financial data, and/or the like.

The consumer devices 108A-108N may be any computing device as known in the art and operated by a consumer. Electronic data received by the server 104 from the consumer devices 108A-108N may be provided in various forms and via various methods. For example, the consumer devices 108A-108N may include desktop computers, laptop computers, smartphones, netbooks, tablet computers, wearables, and the like. The information may be provided through various sources on these consumer devices.

In embodiments where a consumer device 108 is a mobile device, such as a smart phone or tablet, the consumer device 108 may execute an "app" to interact with the promotion and marketing service 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The promotion and marketing service 102 may leverage the application framework offered by the mobile operating system to allow consumers to designate which information is provided to the app and which may then be provided to the promotion and marketing service 102. In some embodiments, consumers may "opt in" to provide particular data to the promotion and marketing service 102 in exchange for a benefit, such as improved relevancy of marketing communications offered to the user. In some embodiments, the consumer may be provided with privacy information and other terms and conditions related to the information provided to the promotion and marketing service 102 during installation or use of the app. Once the consumer provides access to a particular feature of the mobile device, information derived from that feature may be provided to the promotion and marketing service 102 to improve the quality of the consumer's interactions with the promotion and marketing service.

For example, the consumer may indicate that they wish to provide location information to the app from location services circuitry included in their mobile device. Providing this information to the promotion and marketing service 102 may enable the promotion and marketing service 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the promotion and marketing service 102. For example, the consumer may decide at a later point to disable the ability of the app to access the location services circuitry, thus limiting the access of the consumer's location information to the promotion and marketing service 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

Additionally or alternatively, the consumer device 108 may interact through the promotion and marketing service 102 via a web browser. As yet another example, the consumer device 108 may include various hardware or firmware designed to interface with the promotion and marketing service 102 (e.g., where the consumer device 108 is a purpose-built device offered for the primary purpose of communicating with the promotion and marketing service 102, such as a store kiosk).

The merchant devices 110A-110N may be any computing device as known in the art and operated by a merchant. For example, the merchant devices 110A-110N may include a merchant point-of-sale, a merchant local marketing device, a merchant e-commerce server, a merchant inventory system, or a computing device accessing a web site designed to provide merchant access (e.g., by accessing a web page via a browser using a set of merchant account credentials). The merchant devices 110A-110N may also be mobile devices as described above with respect to the consumer devices 108A-108N.

Electronic data received by the promotion and marketing service 102 from the merchant devices 110A-110N may also be provided in various forms and via various methods. For example, the merchant devices 110A-110N may provide real-time transaction and/or inventory information as purchases are made from the merchant. In other embodiments, the merchant devices 110A-110N may be employed to provide information to the promotion and marketing service 102 to enable the promotion and marketing service 102 to generate promotions or other marketing information to be provided to consumers.

An example of a data flow for exchanging electronic marketing information among one or more consumer devices, merchant devices, and the promotion and marketing service is described below with respect to FIG. 3.

Example Apparatuses for Implementing
Embodiments of the Present Invention

The server 104 may be embodied by one or more computing systems, such as apparatus 200 shown in FIG. 2. As illustrated in FIG. 2, the apparatus 200 may include a processor 202, a memory 204, input/output circuitry 206, communications circuitry 208, catalog circuitry 210, inventory circuitry 212, prediction circuitry 214, and item transmission circuitry 216. The apparatus 200 may be configured to execute the operations described above with respect to FIG. 1 and below with respect to FIGS. 4-7. Although these components 202-216 are described with respect to functional limitations, it should be understood that the particular implementations necessarily include the use of particular hardware. It should also be understood that certain of these components 202-216 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processors, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The catalog circuitry 210 includes hardware configured to maintain, manage, and provide access to an item catalog database. The catalog circuitry 210 may provide an interface, such as an application programming interface (API), which allows other components of a system to obtain attributes of one or more items stored in the item catalog database. For example, where items are particular products, services, or promotions, the catalog circuitry 210 may enable access to information about those products, services, or promotions such as prices, titles, names, discount levels, sizes, shapes, colors, locations, narrative descriptions, terms and conditions, or any other attributes of those products, services, or promotions. The catalog circuitry 210 may facilitate access to these attributes through the use of applications or APIs executed using a processor, such as the processor 202. However, it should also be appreciated that, in some embodiments, the catalog circuitry 210 may include a separate processor, specially configured field programmable gate array (FPGA), or application specific interface circuit (ASIC) to manage the offering of promotions via a promotion and marketing service. In some embodiments, the catalog circuitry 210 also includes components for implementing the catalog database. Such components may include a memory, such as the memory 204. The catalog circuitry 210 may also provide interfaces allowing other components of the system to add records to the catalog database, such as in the case of a new item being offered by the promotion and marketing service, edit records within the catalog database, such as in the case of a price change of an item offered by the promotion and marketing service, or delete records within the catalog database, such as in the case of an item no longer being available via the promotion and marketing service. The catalog circuitry 210 may communicate with other components of the system and/or external systems via a network interface provided by the communications circuitry 208. The catalog circuitry 210 is therefore implemented using hardware components of the apparatus configured by either hardware or software for implementing these planned functions.

The inventory circuitry 212 includes hardware configured to manage, store, process, and analyze an inventory of items offered by a promotion and marketing system. Because inventory data may change in real-time as transactions occur, while item attributes may be static, it may be desirable to maintain an inventory database separate from the catalog database managed by the catalog circuitry 210 as described above. It should also be appreciated though, that in some embodiments the catalog circuitry 210 and the inventory circuitry 212 may have similar and/or overlapping functionality, such as in scenarios where the inventory database and catalog database are implemented as components of a single database (e.g., different table structures within the same database) or via the same hardware (e.g., a single external storage node storing both databases). The inventory circuitry 212 may provide an interface, such as an API, which allows other components of a system to obtain inventory data for one or more items referenced in the inventory database. The inventory data may include records identifying particular items and availability of those items for use as the subject of various transactions (e.g., purchase, sale, preorder). For example, the inventory data may include records identifying quantities of items located in particular warehouses, quantities in transit, expected delivery dates and times, expiration dates of particular units of particular items, or the like. The inventory circuitry 212 may also provide access to historical inventory levels, such as rates of sale of particular items, transaction records indicating which items were purchased and when, and the like.

The inventory circuitry 212 may facilitate access to this data through the use of applications or APIs executed using a processor, such as the processor 202. However, it should also be appreciated that, in some embodiments, the inventory circuitry 212 may include a separate processor, specially configured field programmable gate array (FPGA), or application specific interface circuit (ASIC) to manage the offering of promotions via a promotion and marketing service. In some embodiments, the inventory circuitry 212 also includes components for implementing the inventory database. Such components may include a memory, such as the memory 204. The inventory circuitry 212 may also provide interfaces allowing other components of the system to add records to the inventory database, such as in the case of a new quantity of items being received by the promotion and marketing service, edit records within the inventory database, such as in the case of sale of an item offered by the promotion and marketing service, or delete records within the catalog database, such as in the case of an item being sold out or otherwise delisted by the promotion and marketing service. The inventory circuitry 212 may communicate with other components of the system and/or external systems via a network interface provided by the communications circuitry 208. The inventory circuitry 212 is therefore implemented using hardware components of the apparatus configured by either hardware or software for implementing these planned functions.

The prediction circuitry 214 includes hardware configured to predict item inventory levels over time and store those prediction or provide those prediction to other components of a promotion and marketing system. To this end, the prediction circuitry may employ a predictive model that predicts a rate of sale of a given item based on historical data for that item and/or the particular attributes of that item. For example, the predictive model may be trained using historical data for particular items, such that a regression analysis is performed to determine the impact of each attribute of those items on the rate of sale of the particular item. In some embodiments, item attributes are determined through accessing a catalog database, and item inventory levels are determined through accessing an inventory database, such as provided by the catalog circuitry 210 and the inventory circuitry 212 described above, respectively. The prediction circuitry 214 may utilize the predictive model to analyze one or more items currently being offered by a promotion and marketing service, and store or transmit a rate at which those items are expected to sell through their inventory.

The prediction circuitry 214 may perform these predictions at particular intervals (e.g., reviewing each item offered by the promotion and marketing service in turn before starting over and generating new predictions, or predicting the inventory levels for each of the items every hour, every 4 hours, every day, or the like), or in response to an event. For example, an external service (e.g., a service generating an electronic marketing communication) may request inventory levels to ensure that items included in the electronic marketing communication are likely to remain in-stock for a particular period of time. In response, the prediction circuitry 214 may respond to the request by providing the requesting service with the latest inventory levels as stored in memory. Alternatively, the prediction circuitry 214 may dynamically generate a new set of predictions in response to the request. In some embodiments, a request may be for predicted inventory levels associated with all items offered by the promotion and marketing service, while in other embodiments the request may indicate specific items for which a predicted inventory level is desired by the requesting service. Such requests may be received by the inventory circuitry 212 via an API, such that the requesting service performs the request by calling an API function.

The prediction circuitry 214 may provide various types of outputs in various embodiments. For example, in some embodiments the prediction circuitry may provide a list of a plurality of items that have at least a threshold predicted inventory level, while in other embodiments the prediction circuitry may select a particular item or subset of items from among a group of items that have a threshold predicted inventory level. In yet further embodiments, the prediction circuitry 214 may provide an indication of whether a particular item has at least a threshold predicted inventory level (e.g., a "yes or no" response) based on a request identifying that particular item.

The prediction circuitry 214 may also implement systems and processes for updating the predictive model. For example, the prediction circuitry 214 may implement machine learning techniques to modify the weights ascribed to particular item attributes when predicting inventory levels. Examples of data flows and processes for updating the predictive model in this manner are described further below with respect to FIG. 7.

The prediction circuitry 214 may predict inventory levels by employing the predictive model in conjunction with a processor, such as the processor 202. However, it should also be appreciated that, in some embodiments, the prediction circuitry 214 may include a separate processor, specially configured field programmable gate array (FPGA), or application specific interface circuit (ASIC) to manage the offering of promotions via a promotion and marketing service. The prediction circuitry 214 may communicate with other components of the system and/or external systems via a network interface provided by the communications circuitry 208. For example, the prediction circuitry 214 may receive requests from other components of a promotion and marketing service via the communications circuitry 208, via a system bus, shared memory, or other mechanism for inter and intra-system communication. The prediction circuitry 214 is therefore implemented using hardware components of the apparatus configured by either hardware or software for implementing these planned functions.

The item transmission circuitry 216 includes hardware configured to facilitate transmission of items, such as in one or more electronic marketing communications. The item transmission circuitry 216 may, for instance, include various systems for generating emails, text messages, dynamic web pages, or the like. For example, the item transmission circuitry 216 may include a system for generating an electronic marketing communication including marketing materials related to one or more of the items. In some embodiments, the item transmission circuitry 216 may be or include a slot manager, embodiments of which are described in co-pending U.S. patent application Ser. No. 14/219,349, entitled "Method and Apparatus for Generating an Electronic Communication" filed on Mar. 19, 2014, the entire contents of which are hereby incorporated by reference in their entirety. In some embodiments, the item transmission circuitry 216 may be or include a consumer inbox management system, embodiments of which are described in U.S. Provisional Patent Application 62/098,987, entitled "Methods and Systems for Managing Transmission of Electronic Marketing Communications" filed on Dec. 31, 2014, the entire contents of which are hereby incorporated by reference in their entirety.

The item transmission circuitry 216 may be operable to generate a request to the prediction circuitry 214 to obtain a prediction of inventory levels of one or more items. For example, the item transmission circuitry 216 may generate a request to the prediction circuitry 214 in order to ensure that one or more items included in an outgoing electronic marketing communication have sufficient inventory levels to justify transmission of the electronic marketing communication (i.e., the item is in sufficient stock such that it is not likely to sell out even if the electronic marketing communication is not sent), or that the electronic marketing communication is not likely to include an item that is out of stock, thus preventing a scenario where a consumer selects an item to purchase from the electronic marketing communication but is then notified that the item is out of stock.

The item transmission circuitry 216 may generate the electronic marketing communication in conjunction with a processor, such as the processor 202. However, it should also be appreciated that, in some embodiments, the item transmission circuitry 216 may include a separate processor, specially configured field programmable gate array (FPGA), or application specific interface circuit (ASIC) to manage the transmission of one or more items via one or more electronic marketing communications. The item transmission circuitry 216 may transmit electronic marketing communications and communicate with other components of the system and/or external systems via a network interface provided by the communications circuitry 208. The prediction circuitry 216 is therefore implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by example displays described herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Electronic Marketing Information Service Data Flow

FIG. 3 depicts an example data flow 300 illustrating interactions between a server 302, one or more consumer devices 304, and one or more merchant devices 306. The server 302 may be implemented in the same or a similar fashion as the server 104 as described above with respect to FIG. 1 and/or the apparatus 200 described above with respect to FIG. 2, the one or more consumer devices 304 may be implemented in the same or a similar fashion as the consumer devices 108A-108N as described above with respect to FIG. 1, and the one or more merchant devices 306 may be implemented in the same or a similar fashion as the merchant devices 110A-110N as described above with respect to FIG. 1.

The data flow 300 illustrates how electronic information may be passed among various systems when employing a server 302 in accordance with embodiments of the present invention. The one or more consumer devices 304 and/or one or more merchant devices 306 may provide a variety of electronic marketing information to the server 302 for use in providing promotion and marketing services to the consumer. This electronic marketing information may include, but is not limited to, location data, clickstream data, transaction data, communication channel data, and/or discretionary data.

As a result of transactions performed between the one or more consumer devices 304 and the server 302, the server 302 may provide fulfillment data to the consumer devices. The fulfillment data may include information indicating whether the transaction was successful, the location and time the product will be provided to the consumer, instruments for redeeming promotions purchased by the consumer, or the like.

In addition to the e-commerce interactions with the one or more consumer devices 304 offered by the server 302, the server 302 may leverage information provided by the consumer devices to improve the relevancy of electronic marketing communications to individual consumers or groups of consumers. In this manner, the server 302 may determine promotions, goods, and services that are more likely to be of interest to a particular consumer or group of consumers based on clickstream data, location data, and other information provided by and/or relating to particular consumers. For example, the server 302 may detect the location of a consumer based on location data provided by the consumer device, and offer promotions based on the proximity of the consumer to the merchant associated with those promotions. Alternatively, the server 302 may note that the consumer has an interest in a particular hobby (e.g., skiing) based on electronic marketing information associated with the consumer (e.g., a browser cookie that indicates they frequently visit websites that provide snowfall forecasts for particular ski resorts), and offer promotions associated with that hobby (e.g., a promotion offering discounted ski equipment rentals or lift tickets). It should be appreciated that a variety of different types of electronic marketing information could be provided to the server 302 for the purpose of improving the relevancy of marketing communications. It should also be appreciated that this electronic marketing information may be received from a variety of electronic sources, including various consumer devices, merchant devices, and other sources both internal and external to a promotion and marketing service. For example, other data sources may include imported contact databases maintained by merchants, electronic survey questions answered by consumers, and/or various other forms of electronic data.

It should also be appreciated that the server 302 may also control other factors of the electronic marketing communications sent to the consumer other than the particular promotions included in the electronic marketing communication. For example, the server 302 may determine the form, structure, frequency, and type of the electronic marketing communication. As with the content of the electronic marketing communication, these factors may be programmatically determined according to various methods, factors, and processes based on electronic data received by the server 302 for the purpose of maximize the likelihood that the communication will be relevant to the recipient consumer.

In particular, embodiments of the present invention may employ a predictive model to predict item inventory levels of items transmitted to consumers in one or more electronic marketing communications. Items that are predicted to sell out in less than a threshold amount of time may be removed from outgoing electronic marketing communications, prevented from being included in electronic marketing communications replaced with other items, or electronic marketing communications containing those items may be prevented from being transmitted.

The server 302 interactions with the one or more merchant devices 306 may be related to enabling the merchant to market their products using a promotion and marketing service. For example, the one or more merchant devices 306 may provide promotion data defining one or more promotions to be offered by the promotion and marketing service on behalf of the merchant. The server 302 may receive this information and generate information for providing such promotions via an e-commerce interface, making the promotions available for purchase by consumers. The server 302 may also receive information about products from the one or more merchant devices 306. For example, a merchant may provide electronic marketing information indicating particular products, product prices, inventory levels, and the like to be marketed via a promotion and marketing service. The server 302 may receive this information and generate listing information to offer the indicating products to consumers via a promotion and marketing service.

The one or more merchant devices 306 may also receive information from the server 302. For example, in some embodiments a merchant may obtain access to certain business analytic data aggregated, generated, or maintained by the server 302. As a particular example, a merchant might offer to pay for consumer demographic data related to products or services offered by the merchant. It should be appreciated however, that a merchant may not need to list any products or services via the promotion and marketing service in order to obtain such data. For example, the promotion and marketing service may enable merchants to access electronic marketing data offered via the promotion and marketing service based on a subscription model.

The one or more merchant devices 306 may also receive electronic compensation data from the server 302. For example, when a promotion or product is sold by the promotion and marketing service on behalf of the merchant, a portion of the received funds may be transmitted to the merchant. The compensation data may include information sufficient to notify the merchant that such funds are being or have been transmitted. In some embodiments, the compensation data may take the form of an electronic wire transfer directly to a merchant account. In some other embodiments, the compensation data may indicate that a promotion or product has been purchased, but the actual transfer of funds may occur at a later time. For example, in some embodiments, compensation data indicating the sale of a promotion may be provided immediately, but funds may not be transferred to the merchant until the promotion is redeemed by the consumer.

Embodiments advantageously provide for improvements to the server 302 by improving the quality of electronic marketing communications transmitted from the server 302 to the consumer devices 304 by providing for improved identification of related product records. In this manner, embodiments offer improvements to inventory tracking systems that provide for real-time tracking of product inventories and prediction of estimated inventory levels using a framework that maximizes database efficiency. These improvements serve to minimize the transmission of electronic marketing communications that reference sold out items, soon to sell out items, or items that are likely to sell out even without the use of an electronic marketing communication. Furthermore, by providing more accurate recommendations and recommendations that include an awareness of item stock levels, the consumer may gain the same benefit with less system interaction, thus conserving system resources and improving the technical functionality of both the consumer devices 304 and the server 302.

Example Interactions for Performing Item Inventory Predictions Among Components of a Promotion and Marketing System FIG. 4 illustrates an example data flow 400 for predicting item inventory levels as a component of a promotion and marketing service in accordance with some example embodiments of the present invention. The data flow 400 illustrates interactions among database components of a promotion and marketing service, such as an item catalog database 404 and an item inventory database 406, and an inventory prediction system 402. The inventory prediction system 402 may generate a set of item inventory predictions 408 which are presented to external services via an external systems endpoint 410.

The inventory prediction system 402 may include one or more database interfaces 412. The database interface 412 may communicate with the item catalog database 404 and the item inventory database 406. For example, the inventory prediction system 402 may be implemented as prediction circuitry, the item catalog database 404 may be accessed utilizing catalog circuitry, and the item inventory database 406 may be accessed via inventory circuitry such as described above with respect to FIG. 2.

The inventory prediction system 402 may access the item catalog database 404 to identify attributes of one or more items. These items may be identified by various mechanisms. For example, the items may be identified as part of a request received from an external system (not shown), and the inventory prediction system 402 may request item attributes from the item catalog database for each item in the request. Alternatively, the inventory prediction system 402 may periodically request a list of all items from the item catalog database 404, such as in scenarios where the inventory prediction system 402 periodically recalculates predicted inventory levels for each item in the catalog. In some embodiments, each item has a unique identifier by which it is indexed in the item catalog database.

In some embodiments, one of the item attributes stored in the item catalog database 404 is an inventory identifier. The inventory identifier may provide a reference to a record within the item inventory database 406, which indicates the inventory information for that item. For example, the inventory identifier may be a foreign key pointer or other reference to an inventory table or database indicating a record or records associated with inventory information for the item. In some embodiments, the inventory identifier may be used to identify a set of records (e.g., unique promotion vouchers) which correspond to the item from the item catalog database 404, and the number of items in inventory may be calculated based on the number of records from the item inventory database 406 (e.g., the number of unique promotion vouchers associated with the promotion). The inventory identifier may be used as a lookup to the item inventory database 406 by the database interface 412 to obtain the inventory information for the item.

The item attributes and the item inventory information may be provided to a prediction engine 414 by the database interface 412. In some embodiments, the prediction engine 414 may determine the number of units associated with a particular item by counting a number of records returned from the item inventory database 406, such as in the case where the request to the item inventory database 406 receives a list of vouchers associated with the requested item in response.

The prediction engine may use a predictive model that receives the item attributes and the inventory levels as inputs to produce one or more item inventory predictions 408 that indicate various values related to how long the item will take to sell out. Such values may include a time until sold out, a number of units remaining at a particular time (e.g., estimated units remaining in 24 hours, 48 hours, or in one week), an estimated rate of sale over time or at a particular time, or the like. These item inventory predictions 408 may be made available through an external systems endpoint 410 that may be accessed by various external systems (e.g., systems including or implementing item transmission circuitry as described above with respect to FIG. 2) to provide those systems with information regarding predicted item inventories.

Item inventory predictions may be generated through the use of one or more predictive models. For example, the predictive model may include algorithms and/or formulas that determine a rate of sale for an item based on various attributes of that time. These attributes may include, but are not necessarily limited to, the type of item, previous sales of the item, the number of views (e.g., on a web page or within an e-commerce app) of the item, the frequency with which the item has been marketed (e.g., included in an electronic marketing communication), the rate of sales when the item is the subject of an electronic marketing communication, the rate of sales when the item is not the subject of an electronic marketing communication, the size, shape, or color of the item, the title of the item, a category of the item (e.g., promotion, good, service, or trip), a subcategory of the item (e.g., restaurant, spa treatment, beach vacation, mountain vacation), the price of the item, the day of the week, the discount level of the item, or the like. The predictive model may ascribe weights and conversion factors to each of these attributes to map the attributes to an expected sales rate. In some embodiments, the predictive model is generated by using a set of item attributes and sales data for previously sold items as a training set for use in a regression analysis, such as via a machine learning algorithm. The regression analysis may generate the weights and conversion factors for each attribute so that calculating the item inventory level for a new item can be accomplished by feeding the item attributes of the new item into the predictive model.

Example operations and algorithms for generating item inventory predictions are described further below with respect to FIG. 6. Example operations for utilizing machine learning techniques for improving a predictive model for generating item inventory predictions are described further below with respect to FIG. 7.

Example Processes for Predicting Item Inventories

FIG. 5 illustrates an example of a process 500 for predicting item inventory levels in accordance with embodiments of the present invention. The process 500 may be performed by components of an inventory prediction system as described above with respect to FIG. 4. The process 500 may gather item attributes from an item catalog database and inventory attributes from an inventory database and employ a predictive model to predict inventory levels for items within the item catalog at particular time periods. These predictions may be employed by other components of a promotion and marketing system to assist with generation of electronic marketing communications. Item inventory predictions may be performed in real-time as transactions occur, or in an "offline" manner with respect to uses of the predicted inventory levels. For example, embodiments may maintain a table with predicted item inventory levels that is periodically updated at particular intervals. Alternatively, the table may be continuously updated, or updated in response to receiving a request for an item inventory prediction from an external service. Embodiments of the process 500 may be performed by an apparatus, such as the apparatus 200 described with respect to FIG. 2 (e.g., by the prediction circuitry), and/or by an inventory prediction system as described above with respect to FIG. 4.

At action 502, an item identifier is received. The item identifier may be received from an external source, such as from a system as part of an electronic marketing communication generation process, or internally selected. For example, the process 500 may iteratively proceed through each item listed in an item catalog database, or item identifiers may be selected as transactions occur, as new items are added to the item catalog database, after a particular time elapsed since a last prediction for that item, or a variety of other factors. The item identifier may be an index to a database, such as an index to an item catalog database.

At action 504, attributes of the item are determined using the item identifier. For example, the item identifier may be employed to perform a lookup on an item catalog database to identify various attributes associated with the item. The lookup operation may also indicate an item inventory reference that serves to provide a reference to an inventory database which stores inventory information for the item.

At action 506, the inventory reference is used to perform a lookup on the item inventory database to obtain inventory information from which item inventory levels associated with the item may be determined. For example, the inventory information may include data such as a rate of sale of the item, the number of remaining units of the item in stock, and time periods associated with the item (e.g., an expiration time, an amount of time the item has been available, or the like), a list of records associated with the item, or the like. As noted above, in some embodiments the lookup on the item inventory database provides a list of all records of the item inventory database associated with the requested item, and the item inventory level may be determined by counting the number of returned records.

At action 508, an item inventory prediction is performed using the item attributes and the item inventory level. The item inventory prediction may be performed using a predictive model. As described above, the predictive model may be trained using sets of transaction information for previously sold items. The training process may include a regression analysis to determine the impact, if any, of different item attributes on the rate of sale of the particular item. Once the regression analysis is complete, item attributes and current inventory levels may be fed into the predictive model to generate a set of predicted inventory levels. The predicted inventory levels may indicate, for example, the number of units expected to remain in a particular time period (e.g., in one hour, in 12 hours, in 24 hours), whether the item is sold out, whether the item is likely to sell out, the time period before the item is likely to sell out, or the like. The predictive model may receive the item attributes and the item inventory levels as inputs and produce outputs of predicted inventory levels representing the predicted item inventories at particular times.

In some embodiments where the item inventory predictions are generated in response to a request, the request may specify a particular data format for the prediction for use by the requesting system. In the simplest scenario, embodiments may determine the rate of sale of an item and apply the rate of sale to the current inventory of the item to determine the amount of time before the item sells out at the current rate. However, more advanced embodiments may take into account, for example, the rate of sale at particular times during the day (e.g., a rate of sale may be expected to be higher at 3 pm in the afternoon for a time zone for a location associated with the item than 2 am for the same item), the day of the week (e.g., sales of an item at 2 pm may be lower on a weekday than on the weekend), the time remaining for the item (e.g., some items, such as concert tickets, may accelerate in sales as a particular day/time approaches), or the like. To this end, the predictive model may include inputs that incorporate the hour of the day (e.g., local time), the day of the week, the remaining time, and other time-based inputs. For example, the model may note the times of purchases so as to detect that there is a spike in consumer activity (e.g., item purchases or views) at a particular time and at a particular location (e.g., San Francisco), and such features may be used as inputs to the data set used for a regression analysis to derive the predictive model.

At action 510, the predicted inventory levels may be stored. Storing of the predicted inventory levels may include transmitting the predicted inventory levels to a requesting service, storing the predicted inventory levels in a data structure (e.g., a data table), publishing the predicted inventory levels to a particular end point, or the like. The process may complete after storing the predicted inventory levels or, in some embodiments, the process may repeat to begin calculating inventory levels for different items, or repeat the inventory prediction for the same items.

FIG. 6 illustrates an example of a process 600 for utilizing a machine learning model to generate and/or revise a predictive model in accordance with embodiments of the present invention. The process 600 may generate a predictive model through regression analysis of a set of item attributes and item inventory levels. The generated predictive model may be employed to generate a set of item inventory predictions. The item inventory predictions may be compared to actual inventory levels over time to determine the success of the predictive model, and the predictive model may be adjusted based on the success (or lack thereof) of the prior predictions. In this manner, embodiments may improve the predictive model over time to result in more accurate inventory predictions. Embodiments of the process 600 may function as algorithms for predicting inventory levels and revising a predictive model as employed by prediction circuitry as described above with respect to FIG. 2 and as a component of inventory prediction system as described with respect to FIG. 4.

At action 602, a set of item attributes and inventory levels at particular times are determined. Determining of the item attributes and inventory levels may be performed, for example, through analysis of historical transaction records, through monitoring transactions as they occur, or through simulating a set of transactions. For example, the initial "training" data may be generated by taking a snapshot of transaction data from a promotion and marketing system that indicates snapshots of an item's (or items') inventory at a plurality of times.

At action 604, a regression analysis is performed to determine the impact of particular item attributes on the item inventory levels. For example, a given regression analysis may use one or more of the following attributes: units sold until a particular time, category of the item, subcategory of the item, price of the item, discount level of the item, the day of the week of the snapshot, the number of views of the item, or the like. The regression analysis may compare these attributes to the number of units sold to attempt to determine the impact of each attribute on the rate of sale of the item. Various regression techniques, including but not limited to linear regression, random forest regression, gradient boosting, or the like may be employed to perform the regression analysis.

After performing the regression analysis to generate the predictive model, the predictive model may be used at action 606 to predict a set of inventory levels for one or more items for or more particular times. At action 608, the actual inventory levels for those items may be measured at those particular times. For example, the actual inventory levels may be determined through querying an item inventory database. At action 610, the actual inventory levels may be compared with the predicted inventory levels to determine an error of the prediction. To determine the error between the actual inventory levels and the predicted inventory levels, embodiments may determine a mean absolute error between the predicted inventory levels and the actual inventory levels for a plurality of items. Some embodiments may utilize a plurality of predictions to revise, update, or select from a plurality of predictive models, such as through the use of genetic algorithms, neural networks, or the like.

At action 612, the predictive model may be updated based on the determined error. Updating of the predictive model may include, for instance, adjusting the weights for particular item attributes in their impact on the predicted inventory level. Updates to the predictive model may be performed according to various machine learning techniques such as described above. Other features used to update the model may include input features such as a number of item views (e.g., accesses to a web address or other page associated with the item), the amount of time since the item became available via a promotion and marketing service, and the number of units of the item sold. These features may function as feedback to the model which, in turn, adjusts the predictive model through machine-learning techniques. Such updates may occur only if the input features indicate a particular error between predicted values and measured values greater than an error threshold (e.g., if the delta between predicted values and actual values is greater than 5%, 10%, or 25%). This threshold may be determined based on statistical measurements over a particular period of time.

As will be appreciated, computer program code and/or other instructions may be loaded onto a computer, processor or other programmable apparatus's circuitry to produce a machine, such that execution of the code on the machine by the computer, processor, or other circuitry creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or a combination of software and hardware. Furthermore, embodiments may take the form of a computer program product on at least one computer-readable storage medium having computer-readable program instructions (e.g., computer software) embodied in the storage medium. Any suitable computer-readable storage medium may be utilized, including non-transitory hard disks, CD-ROMs, flash memory, optical storage devices, magnetic storage devices, or the like.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus, thereby producing a computer-implemented process such that the instructions executed on the computer or other programmable apparatus cause performance of the steps and thereby implement the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for generating electronic marketing communications, the method comprising:
    determining, by catalog circuitry, an item identifier for at least one item stored in an item catalog database;
    accessing, by catalog circuitry, the item catalog database to determine one or more item attributes for the at least one item;
    accessing, by inventory circuitry, an item inventory database to determine one or more item inventory levels for the at least one item;
    calculating, by prediction circuitry and using a predictive model, a predicted inventory level for the at least one item, the predictive model indicating an estimated inventory level for the at least one item at a particular time subsequent to the calculation of the predicted inventory level, wherein the predictive model receives the one or more item attributes and the one or more item inventory levels as inputs;
    storing, by prediction circuitry, the predicted inventory level; and
    transmitting, by item transmission circuitry and to a consumer device, an electronic marketing communication comprising content related to the at least one item, wherein the content related to the at least one item is included in the electronic marketing communication in response to determining the predicted inventory level indicates the at least one item will not sell out in less than a threshold period of time.

2. The method of claim 1, further comprising transmitting, by item transmission circuitry, the electronic marketing communication in response to the predicted inventory level indicating that the item will not sell out for at least a threshold period of time.

3. The method of claim 1, wherein the item identifier is determined based on the item identifier being received from an electronic marketing communication transmission service, and wherein using the predicted inventory level to evaluate the electronic marketing communication comprises notifying the electronic marketing communication transmission service of the predicted inventory level.

4. The method of claim 1, wherein the predictive model is generated by performing a regression analysis of stored historical data for the one or more item attributes and stored historical data for the or more item inventory levels.

5. The method of claim 1, further comprising:
    determining, by prediction circuitry, an actual inventory level at the particular time for the at least one item;
    determining, by prediction circuitry, an error between the actual inventory level and the predicted inventory level; and
    updating, by prediction circuitry, the predictive model based on the error.

6. The method of claim 5, wherein updating the predictive model comprises adjusting a weight of at least one of the item attributes.

7. The method of claim 1, wherein at least one of the one or more item attributes are used to perform a lookup on the item inventory database.

8. The method of claim 1, wherein evaluating the electronic marketing communication for transmission comprises selecting the at least one item for inclusion in the electronic marketing communication based on the predicted inventory level for the at least one item being greater than a threshold inventory level.

9. An apparatus for generating electronic marketing communications, the apparatus comprising:
catalog circuitry configured to:
determine an item identifier for at least one item stored in an item catalog database; and
access the item catalog database to determine one or more item attributes for the at least one item;
inventory circuitry configured to:
access an item inventory database to determine one or more item inventory levels for the at least one item;
prediction circuitry configured to:
calculate, using a predictive model, a predicted inventory level for the at least one item, the predictive model indicating an estimated inventory level for the at least one item at a particular time subsequent to the calculation of the predicted inventory level, wherein the predictive model receives the one or more item attributes and the one or more item inventory levels as inputs; and
store the predicted inventory level; and
item transmission circuitry configured to:
transmit, to a consumer device, an electronic marketing communication comprising content related to the at least one item, wherein the content related to the at least one item is included in the electronic marketing communication in response to determining the predicted inventory level indicates the at least one item will not sell out in less than a threshold period of time.

10. The apparatus of claim 9, wherein the item transmission circuitry is further configured to transmit the electronic marketing communication in response to the predicted inventory level indicating that the item will not sell out for at least a threshold period of time.

11. The apparatus of claim 9, wherein the item identifier is determined based on the item identifier being received from an electronic marketing communication transmission service, and wherein using the predicted inventory level to evaluate the electronic marketing communication comprises notifying the electronic marketing communication transmission service of the predicted inventory level.

12. The apparatus of claim 9, wherein the predictive model is generated by performing a regression analysis of stored historical data for the one or more item attributes and stored historical data for the or more item inventory levels.

13. The apparatus of claim 9, wherein the prediction circuitry is further configured to:
determine an actual inventory level at the particular time for the at least one item; determine an error between the actual inventory level and the predicted inventory level; and
update the predictive model based on the error.

14. The apparatus of claim 13, wherein updating the predictive model comprises adjusting a weight of at least one of the item attributes.

15. The apparatus of claim 9, wherein at least one of the one or more item attributes are used to perform a lookup on the item inventory database.

16. The apparatus of claim 9, wherein evaluating the electronic marketing communication for transmission comprises selecting the at least one item for inclusion in the electronic marketing communication based on the predicted inventory level for the at least one item being greater than a threshold inventory level.

17. An apparatus for generating electronic marketing communications, the apparatus comprising:
means for determining an item identifier for at least one item stored in an item catalog database;
means for accessing the item catalog database to determine one or more item attributes for the at least one item;
means for accessing an item inventory database to determine one or more item inventory levels for the at least one item;
means for calculating, using a predictive model, a predicted inventory level for the at least one item, the predictive model indicating an estimated inventory level for the at least one item at a particular time subsequent to the calculation of the predicted inventory level, wherein the predictive model receives the one or more item attributes and the one or more item inventory levels as inputs;
means for storing the predicted inventory level; and
means for transmitting, to a consumer device, an electronic marketing communication comprising content related to the at least one item, wherein the content related to the at least one item is included in the electronic marketing communication in response to determining the predicted inventory level indicates the at least one item will not sell out in less than a threshold period of time.

18. The apparatus of claim 17, further comprising means for transmitting the electronic marketing communication in response to the predicted inventory level indicating that the item will not sell out for at least a threshold period of time.

19. The apparatus of claim 17, wherein the item identifier is determined based on the item identifier being received from an electronic marketing communication transmission service, and wherein using the predicted inventory level to evaluate the electronic marketing communication comprises notifying the electronic marketing communication transmission service of the predicted inventory level.

20. The apparatus of claim 17, wherein the predictive model is generated by performing a regression analysis of stored historical data for the one or more item attributes and stored historical data for the or more item inventory levels.

* * * * *